United States Patent [19]

Tsuchiya

[11] 3,812,223
[45] May 21, 1974

[54] PROCESS FOR PRODUCING THIO-OR DITHIO-PHOSPHORIC ACID SALTS

[75] Inventor: Hiroshi Tsuchiya, Oita, Japan

[73] Assignee: Sumitomo Chemical Company, Limited, Osaka, Japan

[22] Filed: July 19, 1971

[21] Appl. No.: 164,090

[30] Foreign Application Priority Data
July 22, 1970  Japan.............................. 46-64638

[52] U.S. Cl........ 260/987, 260/455 A, 260/502.4 R
[51] Int. Cl. .............................................. C07f 9/02
[58] Field of Search.......... 260/502.4 R, 455 A, 987

[56] References Cited
UNITED STATES PATENTS

| | | | |
|---|---|---|---|
| 1,893,018 | 1/1933 | Christmann | 260/987 X |
| 2,629,731 | 2/1953 | Harman | 260/502.4 R UX |
| 3,033,891 | 5/1962 | Grisley, Jr. | 260/987 X |
| 3,139,439 | 6/1964 | Olin | 260/455 A X |
| 3,202,572 | 8/1965 | Werres et al. | 260/455 A X |
| 3,276,977 | 10/1966 | Willmund et al. | 260/502.4 R X |
| 3,309,371 | 3/1967 | Curry et al. | 260/987 X |
| 3,636,144 | 1/1972 | Tsuchiya et al. | 260/987 X |

OTHER PUBLICATIONS
Smith, J. Chem. Soc., pages 3164–3165, 1961.
C. A., Vol. 57 (1962) page 13685b–c.

*Primary Examiner*—Joseph P. Brust
*Attorney, Agent, or Firm*—Stevens, Davis, Miller & Mosher

[57] ABSTRACT

Thio- or dithio-phosphoric acid salts, which are indispensable intermediates for producing phosphoric acid esters of the thiol or dithiol type useful as agricultural chemicals, are produced by reacting a thionophosphoric acid ester with an alkali metal salt of a dithiocarbamic acid at 50° to 150°C in the presence of a solvent such as an aqueous or anhydrous alcohol, a Cellosolve, dimethylformamide, dimethyl sulfoxide, or the like.

5 Claims, No Drawings

PROCESS FOR PRODUCING THIO-OR DITHIO-PHOSPHORIC ACID SALTS

This invention relates to a novel process for producing a thio- or dithio-phosphoric acid salt together with a dithiocarbamic acid ester by reacting a thionophosphoric acid ester with a dithiocarbamic acid salt.

Various processes have heretofore been proposed regarding the synthesis of a certain phosphate which can also be produced by the novel process of the present invention, and examples of those processes are as follows:

1. A process which makes use of sodium mercaptide as described in Chemisches Zentralblatt, Vol. 132, p. 10,725 (1961) (German Patent No. 1,100,019).
2. A process which makes use of potassium xanthogenate as described in Chemical Abstracts, Vol. 57, p. 13,685 (1962) (German Patent No. 1,141,634).
3. A process which makes use of a potassium 0,0-dialkyldithiophosphate as disclosed in Japanese Patent Publication No. 5817/63.

However, these known processes have been unsuitable for commercialization because of such drawbacks as a complicated reaction procedure, which is technically disadvantageous or uneconomical for the commercial production, or inevitably requires or by-produces a component having a disagreeable odor and causing problems on the public hazard, on which great importance is nowadays placed.

The present inventors conducted various researches to overcome the above-said drawbacks of the conventional processes and as a result have found a novel process which is improved in all of the above-said drawbacks. According to the novel process, there are simultaneously produced a thio- or dithio-phosphoric acid salt, which is an indispensable intermediate for the production of agricultural chemicals, and a dithiocarbamic acid ester, which is an effective vulcanization accelerator for rubbers as well as an effective stabilizer for high polymers.

An object of this invention is to provide a process for producing a thio- or dithio-phosphoric acid salt without causing problems on the public hazard.

Another object of this invention is to provide a process for producing a thio- or dithio-phosphoric acid salt in high purity and yield with advantages from economical point of view.

A further object of this invention is to provide a process for the simultaneous production of a thio- or dithio-phosphoric acid salt and a dithiocarbamic acid ester with technical advantage.

According to this invention, there is provided a novel process for producing a thio- or dithio-phosphoric acid salt represented by the general formula,

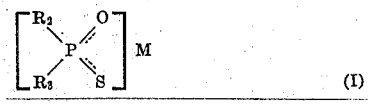
(I)

wherein each of $R_2$ and $R_3$ is alkyl group, alkoxyl group, alkylthio group, substituted- or unsubstituted-phenyl or -phenylthio group, 1- or 2-naphthoxyl group, cyclohexyl group, cyclohexylthio group, phenylalkyl or phenylalkylthio group (in which the phenyl group may be substituted or unsubstituted by alkyl group(s) or halogen atom(s)), benzylamino group, amino group having the general formula

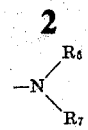

(in which each of $R_6$ and $R_7$ is hydrogen atom, alkyl group, alkenyl group, or substituted or unsubstituted phenyl group), or phenoxy group having the general formula

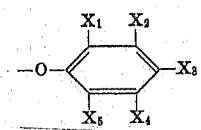

(in which each of $X_1$, $X_2$, $X_3$, $X_4$ and $X_5$ is hydrogen atom, halogen atom, alkyl group, alkoxyl group, alkylthio group, phenyl group, alkyl-substituted or -unsubstituted amino group), except for the case where $R_2$ and $R_3$ are simultaneously thio groups; and $M$ is an alkali metal atom, which comprises reacting a thionophosphoric acid ester represented by the general formula,

(III)

wherein $R_1$ is alkyl group having one to five carbon atoms, and $R_2$ and $R_3$ are the same as defined above, with a dithiocarbamic acid salt represented by the general formula,

(IV)

wherein each of $R_4$ and $R_5$ is hydrogen atom, alkyl group or phenyl group and $M$ is the same as defined above.

According to the present process, there is also prepared simultaneously a dithiocarbamic acid ester represented by the general formula,

(II)

wherein $R_1$, $R_4$ and $R_5$ are the same as defined above.

In the present invention, the term "alkyl" means an alkyl group having one to four carbon atoms unless otherwise provided.

The process of this invention may be represented by the following reaction scheme:

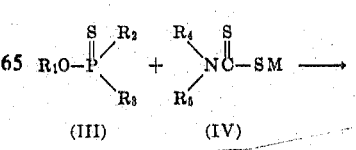
(III)         (IV)

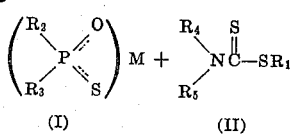

The above-said reaction is carried out in the presence of a solvent. Suitable solvents are those which possess a high polarity, and aqueous or anhydrous alcohols, Cellosolves, dimethylformamide, dimethyl sulfoxide, and the like, are preferably used. Although the reaction conditions depend upon kinds of the starting materials, i.e., thionophosphoric acid esters and dithiocarbamic acid salts and the solvent to be used, the reaction temperature is generally about 50° to about 150°C, preferably at the refluxing temperature of the solvent, and the reaction time is about 1 to about 8 hours.

As the thionophosphoric acid ester represented by the general formula (III) which is one of the starting materials, there may be mentioned 0,0-diethyl S-benzyl phosphorothionothiolate
0,0-diethyl S-phenyl phosphorothionothiolate
0,0-di-n-butyl S-ethyl phosphorothionothiolate
0,0-diethyl 0-phenyl phosphorothionate
0,0-diethyl 0-p-methylmercaptophenyl phosphorothionate
0,0-dimethyl N-phenyl phosphorothionoamidate
0,0-diethyl N-n-butyl phosphorothionoamidate
0,0-dimethyl N,N-dimethyl phosphorothionoamidate, and
0-ethyl phenylphosphonothionoamidate.

As the dithiocarbamic acid salt represented by the general formula (IV), which is the other starting material, there may be mentioned sodium N-methyldithiocarbamate, sodium N,N-dimethyldithiocarbamate, sodium N-ethyldithiocarbamate, sodium N,N-diethyldithiocarbamate, sodium N-phenyldithiocarbamate, potassium N-methyldithiocarbamate, potassium N,N-dimethyldithiocarbamate, potassium N-phenyldithiocarbamate, potassium N,N-diethyldithiocarbamate, etc.

Although it is most preferred to use these dithiocarbamic acid salts in an isolated dry state, an aqueous solution of the concentration higher than 40 percent can be used for the reaction to proceed smoothly.

The thionophosphoric acid ester represented by the general formula (III) is used in an almost equimolar amount of the dithiocarbamic acid salt represented by the general formula (IV).

After completion of the reaction in the abovesaid manner, water and a solvent which is insoluble or sparingly soluble in water, such as, for example, benzene, toluene, or the like, are added to the reaction mixture to transfer the objective thio- or dithio-phosphate to the water layer, and the co-produced dithiocarbamic acid ester represented by the general formula (II) to the organic solvent layer. By separating the two layers from each other, an aqueous solution of the objective thio- or dithio-phosphoric acid salt may be obtained in high yield and high purity. The thio- or dithio-phosphoric acid salt may be isolated by concentrating the said aqueous solution and, in some cases, may further be purified by recrystallization. In general, however, the thio- or dithio-phosphoric acid salt is used in the form of the said aqueous solution as it is in further condensing with a halogen compound to synthesize a phosphoric acid ester which is the final product.

The thio- or dithio-phosphoric acid salts obtained by the process of the present invention are intermediates indispensable for producing with industrial advantage phosphoric acid esters of the thiol-type or dithio-type, which are useful as agricultural chemicals, particularly as insecticides and fungicides.

Further, the dithiocarbamic acid esters, which are represented by the general formula (II) and are obtained by the process of the present invention, may be used as a vulcanization accelerator for rubbers or a stabilizer for high polymers. Thus, the process of the present invention may be deemed to be a process having a great industrial advantage in producing none of the undesirable by-products.

The process of the present invention is further illustrated below in detail with reference to Examples, which are not intended to limit the scope of the present invention.

Example 1

17.1 Grams of sodium N,N-diethyldithiocarbamate was dissolved in 30 ml of dimethylformamide. To the solution, heated at 100°C, was added dropwise 23.6 g of 0,0-diethyl N-n-butylphosphorothionoamidate over 30 minutes. After completion of the addition, the mixture was maintained at the same temperature for 2 hours, and then freed from the dimethylformamide under reduced pressure. To the residue, were added 30 ml of water and 30 ml of benzene, and the mixture was thoroughly stirred. Then the layers were separated from each other to obtain an aqueous solution of the objective sodium 0-ethyl N-n-butylphosphorothionoamidate. The yield was 94 percent based on sodium N,N-diethyldithiocarbamate.

Example 2

19.9 Grams of a 80 percent-aqueous solution of potassium N,N-dimethyldithiocarbamate was dissolved in 30 ml of n-butanol. To the solution, while being refluxed, was added dropwise 28.4 g of 0,0-di-n-butyl S-ethyl phosphorothionothiolate over about one hour. After the addition, the mixture was refluxed for 5 hours while removing the distilled water. Then, the n-butanol was removed by distillation under reduced pressure. To the residue, were added 30 ml of water and 30 ml of toluene, and the mixture was thoroughly stirred. Then, the layers were separated from each other, and the aqueous layer was freed from water under reduced pressure to obtain 24.1 g of hygroscopic white crystals of the objective potassium 0-n-butyl S-ethyl phosphorodithioate. The yield was 95.5 percent based on potassium N,N-dimethyldithiocarbamate.

Examples 3 to 25

The starting materials of the formulas (III) and (IV) having groups or atoms which are shown in Table 1 for $R_1$, $R_2$, $R_3$, $R_4$, $R_5$ and $M$ were reacted under the conditions as shown in Table 1. Thereafter, the reaction products were treated in the same manner as in Example 1, to obtain corresponding thio- or dithio-phosphoric acid salts. The yields and physical properties of the products were as shown in Table 1.

TABLE 1

| Ex. No. | $R_1$ | $R_2$ | $R_3$ | $R_4$ | $R_5$ | M | Solvent | Reaction temperature, °C | Reaction time, hours | Yield, percent | Physical property |
|---|---|---|---|---|---|---|---|---|---|---|---|
| 3 | $C_2H_5$ | $C_2H_5O$ | C₆H₅–CH₂S– | $CH_3$ | $CH_3$ | Na | Ethanol | Reflux | 7 | 93 | M.P. 181° C. |
| 4 | $C_2H_5$ | $C_2H_5O$ | C₆H₅–S– (with H) | $CH_3$ | $CH_3$ | K | Methylcellosolve | 115 | 5 | (a) | |
| 5 | $C_2H_5$ | $C_2H_5O$ | C₆H₅–CH₂·CH₂·S– | $CH_3$ | $CH_3$ | K | Ethanol | Reflux | 7 | (a) | M.P. 158° C. |
| 6 | $C_2H_5$ | $C_2H_5O$ | $n\text{-}C_4H_9\text{-}S$ | $CH_3$ | $CH_3$ | K | do | do | 5 | (a) | M.P. 170° C. |
| 7 | $C_2H_5$ | $CH_2_5O$ | C₆H₅–S– | $CH_3$ | $CH_3$ | K | do | do | 5 | (a) | |
| 8 | $C_2H_5$ | $C_2H_5O$ | $C_2H_5S$ | $CH_3$ | $CH_3$ | Na | do | do | 5 | 92 | M.P. 146° C. |
| 9 | $n\text{-}C_4H_9$ | $n\text{-}C_4H_9O$ | $C_2H_5S$ | $CH_3$ | $CH_3$ | Na | Methylcellosolve | 115 | 5 | (a) | |
| 10 | $n\text{-}C_4H_9$ | $n\text{-}C_4H_9O$ | C₆H₅–CH₂S– | $CH_3$ | $CH_3$ | K | n-Butanol | 115 | 5 | (a) | |
| 11 | $C_2H_5$ | $C_2H_5O$ | C₆H₅–CH₂NH– | $CH_3$ | $CH_3$ | K | Ethanol | Reflux | 4 | (a) | |
| 12 | $C_2H_5$ | $C_2H_5O$ | Cl–C₆H₄–CH₂S– | $CH_3$ | $CH_3$ | K | do | do | 5 | 92 | |
| 13 | $CH_3$ | $CH_3O$ | $NH_2$ | $CH_3$ | $CH_3$ | Na | Methanol | do | 5 | 90 | |
| 14 | $C_2H_5$ | $C_2H_5O$ | $Sec\text{-}C_4H_9\text{-}S$ | $C_2H_5$ | $C_2H_5$ | Na | Ethanol | do | 5 | 90 | |
| 15 | $CH_3$ | $CH_3O$ | $CH_2=CH\cdot CH_2NH$ | $CH_3$ | H | Na | Methanol | do | 6 | 89 | |
| 16 | $CH_3$ | $CH_3O$ | C₆H₅–NH– | $CH_3$ | $CH_3$ | Na | do | do | 5 | (a) | |
| 17 | $CH_3$ | $CH_3O$ | 2,4-Cl₂C₆H₃–NH– | $CH_3$ | $CH_3$ | K | do | do | 5 | (a) | |
| 18 | $C_2H_5$ | $C_2H_5O$ | CH₃S–C₆H₄–O– | $CH_3$ | $CH_3$ | K | Ethanol | do | 6 | 95 | |
| 19 | $CH_3$ | $CH_3O$ | $(CH_3)_2N$ | $CH_3$ | $CH_3$ | K | Methanol | do | 4 | (a) | |
| 20 | $C_2H_5$ | $C_2H_5O$ | C₆H₅–C₆H₄–O– | $CH_3$ | $CH_3$ | K | Ethanol | do | 6 | 93 | |
| 21 | $C_2H_5$ | $C_2H_5O$ | CH₃O–C₆H₄–O– | $CH_3$ | $CH_3$ | K | do | do | 6 | (a) | |
| 22 | $C_2H_5$ | $C_2H_5O$ | naphthyl–O– | $CH_3$ | $CH_3$ | K | do | do | 6 | 92 | |
| 23 | $n\text{-}C_3H_7$ | $n\text{-}C_3H_7O$ | C₆H₅–CH₂S– | $CH_3$ | $CH_3$ | K | n-Butanol | 100 | 4 | 95 | |
| 24 | $C_2H_5$ | C₆H₅ | $NH_2$ | $CH_3$ | $CH_3$ | K | Ethanol | Reflux | 6 | 90 | |
| 25 | $CH_3$ | $CH_3$ | Cl₂C₆H₃–O– | $CH_3$ | $CH_3$ | K | Methanol | do | 6 | 93 | | a Quantitative.

NOTE.—The oblique line drawn across the column "physical property" means that the product was obtained in the form of an aqueous solution and not isolated therefrom.

---

What is claimed is:

1. A process for producing a phosphoric acid salt of the formula,

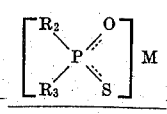

wherein each of $R_2$ and $R_3$ is a $C_{1-4}$ alkyl group, a $C_{1-4}$ alkoxy group, a $C_{1-4}$ alkylthio group, a phenyl group, a tolyl group, a chlorophenyl group, a phenylthio group, a tolylthio group, a chlorophenylthio group, a 1- or 2-naphthoxy group, a cyclohexyl group, a cyclohexylthio group, a benzyl group, a benzylthio group, a tolylmethylthio group, a chlorobenzylthio group, a benzylamino group, an amino group having the formula

wherein $R_6$ and $R_7$ are selected from the group consisting of a hydrogen atom, a $C_{1-4}$ alkyl group, a tolyl group, a $C_{2-4}$ alkenyl group, a phenyl group, a chlorophenyl group and a dichlorophenyl group, or a phenoxy group having the formula,

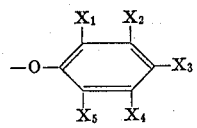

wherein each of $X_1$ to $X_5$ are selected from the group consisting of a hydrogen atom, a halogen atom, a $C_{1-4}$ alkyl group, a $C_{1-4}$ alkoxy group, a $C_{1-4}$ alkylthio group, a phenyl group, a $C_{1-4}$ alkylsubstituted or -unsubstituted amino group, with the proviso that $R_2$ and $R_3$ do not contain sulfur at the same time; and M is an alkali metal atom, which comprises reacting a thionophosphoric acid ester represented by the formula,

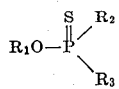

wherein $R_1$ is an alkyl group having one to five carbon atoms, and $R_2$ and $R_3$ are as defined above, with a dithiocarbamic acid salt of the formula,

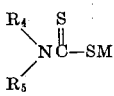

wherein each of $R_4$ and $R_5$ is a hydrogen atom, a $C_{1-4}$ alkyl group or a phenyl group, and M is as defined above, at a temperature of from 50° to 150°C
in about an equimolar amount of the thionophosphoric acid ester per mole of the dithiocarbamic acid salt
in the presence of a solvent selected from the group consisting of water, aqueous or anhydrous alcohols, 2-ethoxyethanol, dimethylformamide and dimethylsulfoxide.

2. A process according to claim 1, wherein the reaction is carried out for 1–8 hours.

3. A process according to claim 1, wherein the dithiocarbamic acid salt is selected from the group consisting of sodium N-methyldithiocarbamate, sodium N,N-dimethyldithiocarbamate, sodium N-ethyldithiocarbamate, sodium N,N-diethyldithiocarbamate, sodium N-phenyldithiocarbamate, potassium N-methyldithiocarbamate, potassium N,N-dimethyldithiocarbamate, potassium N-phenyldithiocarbamate, and potassium N,N-diethyldithiocarbamate.

4. A process according to claim 1, wherein the thionophosphoric acid ester is selected from the group consisting of 0,0-diethyl S-benzyl phosphorothionothiolate
0,0-diethyl S-phenyl phosphorothionothiolate
0,0-di-n-butyl S-ethyl phosphorothionothiolate
0,0-diethyl 0-phenyl phosphorothionate
0,0-diethyl 0-p-methylmercaptophenyl phosphorothionate
0,0-dimethyl N-phenyl phosphorothionoamidate
0,0-diethyl N-n-butyl phosphorothionoamidate
0,0-dimethyl N,N-dimethyl phosphorothionoamidate, and
0-ethyl phenylphosphonothionoamidate.

5. A process according to claim 1, wherein the alkali metal atom represented by M is potassium or sodium.

* * * * *